United States Patent
Watanabe et al.

(10) Patent No.: US 9,845,403 B2
(45) Date of Patent: Dec. 19, 2017

(54) INK IMAGE MATTER GENERATING METHOD

(71) Applicant: FUJIFILM Corporation, Tokyo (JP)

(72) Inventors: Hiroki Watanabe, Kanagawa (JP); Tomohiro Mizuno, Kanagawa (JP); Hideyasu Ishibashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/595,169

(22) Filed: May 15, 2017

(65) Prior Publication Data

US 2017/0247560 A1 Aug. 31, 2017

Related U.S. Application Data

(63) Continuation of application No. PCT/JP2015/080087, filed on Oct. 26, 2015.

(30) Foreign Application Priority Data

Nov. 28, 2014 (JP) .................. 2014-242070

(51) Int. Cl.
*B41J 2/21* (2006.01)
*B41J 2/52* (2006.01)
(Continued)

(52) U.S. Cl.
CPC ............. *C09D 11/40* (2013.01); *B41J 2/21* (2013.01); *B41J 2/52* (2013.01); *B44F 1/08* (2013.01);
(Continued)

(58) Field of Classification Search
CPC ............... B41J 2/21; B41J 2/52; C09D 11/40
See application file for complete search history.

(56) References Cited

U.S. PATENT DOCUMENTS

2004/0187737 A1  9/2004  Iwanami et al.
2006/0164700 A1  7/2006  Hayashi
(Continued)

FOREIGN PATENT DOCUMENTS

JP  2002-038063 A  2/2002
JP  2002-292909 A  10/2002
(Continued)

OTHER PUBLICATIONS

International Search Report for PCT/JP2015/080087 dated Nov. 17, 2015 [PCT/ISA/210].
(Continued)

*Primary Examiner* — Jason Uhlenhake
(74) *Attorney, Agent, or Firm* — Sughrue Mion, PLLC

(57) ABSTRACT

Provided is an ink image matter generating method for selecting a fluorescent ink by performing (a) a process of color-measuring a target color which is a target of color reproduction on a medium and the medium on which an inkjet color ink for color reproduction of the target color is printed; (b) a process of calculating a difference between a colorimetric value of the target color and a colorimetric value of the medium on which the color ink is printed; and (c) a process of selecting a fluorescent ink for reducing the difference between the colorimetric value of the target color and the colorimetric value of the medium on which the color ink is printed, from fluorescent inks that are set in advance, and jetting droplets of the selected fluorescent ink together with the color ink, or after the droplets of the color ink are jetted to cause the fluorescent ink to exist on a surface of an ink image matter, thereby making it possible to select and use an appropriate fluorescent ink with respect to a specific color of which the color reproducibility cannot be ensured using only a color ink in inkjet printing on a medium which is a printing substrate and to ensure high color reproduc- (Continued)

ibility ensuring high color reproducibility for the specific color.

11 Claims, 9 Drawing Sheets

(51) Int. Cl.
*C09D 11/40* (2014.01)
*C09D 11/322* (2014.01)
*H04N 1/60* (2006.01)
*B44F 1/08* (2006.01)
*B41M 5/00* (2006.01)

(52) U.S. Cl.
CPC .............. *C09D 11/322* (2013.01); *H04N 1/60* (2013.01); *B41M 5/00* (2013.01)

(56) References Cited

U.S. PATENT DOCUMENTS

2006/0234018 A1   10/2006   Nagashima et al.
2011/0094694 A1   4/2011    Hunke et al.
2012/0081444 A1*  4/2012    Saito ..................... B41J 2/2146
                                                              347/15
2015/0302285 A1*  10/2015   Manda ............... G06K 15/1878
                                                              358/519

FOREIGN PATENT DOCUMENTS

| | | |
|---|---|---|
| JP | 2004-291508 A | 10/2004 |
| JP | 2005-125643 A | 5/2005 |
| JP | 2006-238408 A | 9/2006 |
| JP | 2011-522972 A | 8/2011 |
| JP | 2014-136413 A | 7/2014 |
| WO | 2006/049305 A1 | 5/2006 |

OTHER PUBLICATIONS

Written Opinion for PCT/JP2015/080087 dated Nov. 17, 2015 [PCT/ISA/210].

* cited by examiner

INK IMAGE MATTER GENERATING METHOD

CROSS REFERENCE TO RELATED APPLICATIONS

This application is a continuation application of International Application No. PCT/JP2015/080087 filed on Oct. 26, 2015, which claims priority under 35 U.S.C. 119(a) to Japanese Patent Application No. 2014-242070 filed on Nov. 28, 2014. Each of the applications hereby expressly incorporated by reference into the present application.

BACKGROUND OF THE INVENTION

1. Field of the Invention

The present invention relates to an ink image matter generating method, and more particularly, to an ink image matter generating method capable of manufacturing an ink image matter on which an ink image in which color reproducibility of a specific color is enhanced using a fluorescent ink is drawn, in drawing an ink image onto a printing substrate medium, particularly, a chromatic color printing substrate medium, for example, a special printing substrate medium such as a cardboard, for example, using inkjet printing.

2. Description of the Related Art

In the related art, in inkjet printing, in order to draw a color character, a color mark, and a high-definition color image (hereinafter, they are represented as a color image), color inks such as cyan, magenta, and yellow have been used. Tint or vividness of such a color image is influenced by a color of a surface to be printed of a printing substrate medium. For this reason, in the related art, in order to reproduce a high-definition color image, a medium such as inkjet paper with high whiteness of a surface to be printed or inkjet glossy paper has been used.

However, in a printing substrate medium such as general printing paper which is generally used, whiteness or visible light reflectance is low compared with inkjet paper. Further, in paper that is white but has tint, for example, in a white printing substrate medium with a yellowish ground color on a surface to be printed, such as recycled paper or official postcards, or in a chromatic color printing substrate medium such as color printing paper, light is absorbed in a specific wavelength band in a visible light wavelength region, and thus, reflectance may not be uniform, and coloring may not be sufficient.

Here, in such a chromatic color printing substrate medium, particularly, in printing with respect to a special printing substrate medium such as a cardboard, generally, the number of colors to be printed is limited. For example, in such a cardboard, specific 18 colors are regulated as a standard for cardboard printing colors, which is the Standard of Japan Corrugated Industry Association (JCS: standard of colors to be printed on cardboard industry standard M0001-2000 cardboard).

In a case where the regulated colors are reproduced by inkjet printing, most of special printing substrate mediums have chromatic colors. Thus, in many cases, even if droplets of color inks such as C, M, and Y are jetted on a special printing substrate medium such as a chromatic color medium, light is absorbed in a specific wavelength band, and coloring deteriorates in the wavelength band, so that reproducibility of several colors among the regulated colors is lowered.

For this reason, in order to draw a high-definition color image on a general printing substrate medium or a chromatic color printing substrate medium which is not expensive inkjet paper using inkjet printing, JP2002-038063A proposes an inkjet recording method using a white ink to be used for substrate treatment of a recording medium on which an image is to be formed, or complementary color treatment depending on a ground color of the recording medium, in addition to color inks.

In the technique disclosed in JP2002-038063A, even in a case where color printing is performed with respect to a white recoding medium with a yellowish ground color of a surface to be printed, or colored paper, it is possible to reproduce a bright color image without being influenced by the ground color of the recording medium.

Further, similarly, in order to draw a high-definition color image, JP2005-125643A proposes an image forming method using a white ink containing white pigments and an ink containing a fluorescent whitening agent, in addition to color inks containing color coloring materials.

In the technique disclosed in JP2005-125643A, by jetting the ink containing the fluorescent whitening agent on a color image formed by the color inks and/or a white image formed by the white ink to form a coating layer, it is possible to reproduce an image with colors similar to fluorescent colors as a color image, and to obtain a white image with extremely high brightness. Further, it is possible to recognize a color image contiguous to the white image with high brightness as an image with higher saturation according to visual characteristics of color recognition based on comparison with white, to thereby obtain an excellent image in a white background characteristic, drawability of a color image and image storability.

Further, JP2011-522972A proposes a fluorescent whitening agent composition for whitening paper used in a paper manufacturing process to obtain paper with high whiteness.

The fluorescent whitening agent composition disclosed in JP2011-522972A may be used to enhance printing performance of inkjet printing. Further, the fluorescent whitening agent composition may be used for the ink containing the fluorescent whitening agent disclosed in JP2005-125643A.

SUMMARY OF THE INVENTION

However, in the techniques disclosed in JP2002-038063A and JP2005-125643A, since a white ink is used for substrate treatment, complementary color treatment, or white background treatment with respect to a ground color of a surface to be printed of a printing substrate medium, the ground color for color printing is changed into a white background. Thus, an excellent effect is achieved in the case of a printing substrate medium or the like having a yellowish ground color. However, in a case where color printing is performed on a ground color of on a chromatic color printing substrate medium such as color printing paper or a cardboard, there is a problem in that unnaturalness occurs in a color image and a high-definition color image cannot be reproduced.

Further, in the technique disclosed in JP2005-125643A, a color image contiguous to a white image with high brightness is recognized as an image with higher saturation, according to visual characteristics based on comparison with white. However, in a case where a color image is formed on a ground color of a chromatic color printing substrate medium such as color printing paper or a cardboard without using a white ink, a high-definition color image cannot be reproduced with respect to the ground color of the chromatic color printing substrate medium. In addition, since chromatic color printing substrate mediums have various different ground colors, even if inkjet printing is performed on the ground colors of the chromatic color printing substrate mediums to form color images, in many cases, light is absorbed in a specific wavelength band, and thus, reflectance is lowered, coloring deteriorates, and color reproducibility is lowered. Thus, by simply jetting the ink containing the fluorescent whitening agent according to the ground colors of the chromatic color printing substrate mediums, it is not possible to ensure color reproducibility of a specific color in which the color reproducibility is lowered, and it is not possible to reproduce a high-definition color image.

Further, in the technique disclosed in JP2011-522972A (JP-H23-522972A), the ink containing the fluorescent whitening agent disclosed in JP2005-125643A can be used as the fluorescent whitening agent. However, since the technique discloses characteristic improvement of the fluorescent whitening agent composition, the technique does not disclose any method for enhancement of color reproducibility in a specific color in which reflectance is lowered in a specific local wavelength region of visible light and color reproducibility cannot be ensured, as in a chromatic color printing substrate medium, for example.

As described above, in the related art, a high-definition color image cannot be reproduced on a chromatic color printing substrate medium with low reproducibility of a specific color among regulated colors through jetting of droplets of color inks, such as the above-described special printing substrate medium such as a cardboard. Thus, in application of inkjet printing to such a chromatic color printing substrate medium, similarly, there is a need for improving color reproducibility of a specific color among regulated colors, for example, only a specific color in which compatibility with a ground color of the chromatic color printing substrate medium is poor and color reproducibility cannot be ensured.

In order to solve the above-mentioned problems in the related art, an object of the invention is to provide an ink image matter generating method capable of securing, by selecting and using an appropriate fluorescent ink suitable for realizing high color reproducibility with respect to a specific color of which color reproducibility cannot be ensured using only color inks in inkjet printing on a printing substrate medium (hereinafter, referred to as a medium), particularly, on a chromatic color medium, high color reproducibility with respect to the specific color.

Further, another object of the invention is to provide an ink image matter generating method capable of securing high color reproducibility with respect to a specific color, by jetting droplets of a fluorescent ink at an appropriate droplet jetting position with respect to a color ink, in addition to the above-mentioned object.

Furthermore, still another object of the invention is to provide an ink image matter generating method capable of securing high color reproducibility with respect to a specific color by determining an appropriate droplet jetting amount of a fluorescent ink for a color ink and jetting droplets of the fluorescent ink by the determined droplet jetting amount, in addition to the above-mentioned objects.

In order to achieve the above-mentioned objects, according to an aspect of the invention, there is provided an ink image matter generating method for, when jetting droplets of an inkjet color ink on a medium to generate an ink image matter, selecting a fluorescent ink in the following processes (a) to (c), and jetting droplets of the selected fluorescent ink together with the color ink, or after the droplets of the color ink are jetted to cause the fluorescent ink to exist on a surface of the ink image matter. Here, the processes are (a) a process of color-measuring a target color which is a target of color reproduction on the medium and the medium on which the color ink for color reproduction of the target color is printed; (b) a process of calculating a difference between a colorimetric value of the target color and a colorimetric value of the medium on which the color ink is printed; and (c) a process of selecting a fluorescent ink for reducing the difference between the colorimetric value of the target color and the colorimetric value of the medium on which the color ink is printed, from fluorescent inks that are set in advance.

Here, it is preferable that the medium is a chromatic color medium.

Further, it is preferable that when wavelengths of respective colors of red R, green G, and blue B are represented as $\lambda_R$, $\lambda_G$, and $\lambda_B$, respectively, wavelengths in which a light emitting spectrum becomes a maximum with respect to three fluorescent inks of an R light emitting fluorescent ink, a G light emitting fluorescent ink, and a B light emitting fluorescent ink which are set in advance are represented as $\lambda_R'$, $\lambda_G'$, and $\lambda_B'$, respectively, the nearest wavelengths on a short wavelength side at the time of 2% of maximum light emitting spectrum values are represented as $\lambda_R'$left, $\lambda_G'$left, and $\lambda_B'$left, and the nearest wavelengths on a long wavelength side at the time of 2% of the maximum light emitting spectrum values are represented as $\lambda_R'$right, $\lambda_G'$right, and $\lambda_B'$right, each of three integrated differences of the respective colors of red R, green G, and blue B obtained by integrating a difference between reflection spectrums of each target color and each medium on which the color ink is printed in each wavelength band of $\lambda_R'\text{left} \leq \lambda_R \leq \lambda_R'\text{right}$, $\lambda_B'\text{left} \leq \lambda_B \leq \lambda_B'\text{right}$, and $\lambda_G'\text{left} \leq \lambda_G \leq \lambda_G'\text{right}$ is used as the difference between the colorimetric values of the target color and the medium on which the color ink is printed, calculated in the calculating process (b).

Further, it is preferable that in the selection process (c), in order to reduce a maximum integrated difference which is the largest value among the three integrated differences of the respective colors of red R, green G, and blue B, a fluorescent ink having a wavelength band of a color corresponding to the maximum integrated difference as a wavelength band of a light emitting spectrum is selected.

Further, it is preferable that when wavelengths of respective colors of red R, green G, and blue B are represented as $\lambda_R$, $\lambda_G$, and $\lambda_B$, respectively, and wavelengths in which a light emitting spectrum becomes a maximum with respect to three fluorescent inks of an R light emitting fluorescent ink, a G light emitting fluorescent ink, and a B light emitting fluorescent ink which are set in advance are represented as $\lambda_R'$, $\lambda_G'$, and $\lambda_B'$, respectively, each of three short wavelength differences of the respective colors of red R, green G, and blue B obtained by selecting a difference between reflection spectrums of each target color and each medium on which the color ink is printed in each of $\lambda_R = \lambda_R'$, $\lambda_G = \lambda_G'$, $\lambda_B = \lambda_B'$ which are single wavelengths that represent red R, green G, and blue B is used as the difference between the colorimetric values of the target color and the medium on which the color ink is printed, calculated in the calculating process (b).

Further, it is preferable that in the selection process (c), in order to reduce a maximum short wavelength difference which is the largest value among the three short wavelength differences of the respective colors of red R, green G, and blue B, a fluorescent ink having a wavelength band of a color corresponding to the maximum short wavelength difference as an excitation wavelength band is selected.

Further, it is preferable that after the droplets of the color ink are jetted on the medium, the droplets of the fluorescent ink are jetted on the color ink on the medium to cause the fluorescent ink to exist on the surface of the ink image matter.

Further, it is preferable that the fluorescent ink is mixed with the color ink, and the droplets of the fluorescent ink are jetted on the medium together with the color ink to cause the fluorescent ink to exist on the surface of the ink image matter.

Further, it is preferable that when among every two intersections between an excitation spectrum of the fluorescent ink and a reflection spectrum of each color ink among a plurality of color inks for generating the ink image matter, a wavelength of the nearest intersection on a short wavelength side when seen from a maximum wavelength in which the excitation spectrum of the fluorescent ink becomes a maximum is represented as $\lambda_{color}$left, and a wavelength of the nearest intersection on a long wavelength side when seen from the maximum wavelength is represented as $\lambda_{color}$right, and when among integrated differences corresponding to the number of the plurality of color inks obtained by integrating a difference between the excitation spectrum of the selected fluorescent ink and the reflection spectrum of each color ink among the plurality of color inks for generating the ink image matter in a wavelength band of $\lambda_{color}$left$\leq\lambda_{color}\leq\lambda_{color}$right, one color ink having the largest value among the integrated differences is referred to as a color ink A and the other one or more color inks are referred to as a color ink B, as a fluorescent ink droplet jetting method which is most preferentially performed, with respect to the color ink A, the droplets of the fluorescent ink are jetted in a region where droplets of the color ink A are not jetted, and with respect to the color ink B, the droplets of the fluorescent ink are jetted in a region where droplets of the color ink B are jetted, together with the color ink B or after the droplets of the color ink B are jetted, so that the fluorescent ink is caused to exist on the surface of the ink image matter.

Further, it is preferable that in a case where a color difference between the color of the ink image matter on the medium on which the color ink for color reproduction of the target color is printed, obtained by performing the droplet jetting method of the fluorescent ink which is most preferentially performed, and the target color is larger than a target color difference, with respect to the color ink A, the droplets of the fluorescent ink are also jetted in a region where the droplets of the color ink A are jetted, in addition to the region where the droplets of the color ink A are not jetted, together with the color ink A or after the droplets of the color ink A are jetted, so that the fluorescent ink is caused to exist on the surface of the ink image matter.

Further, it is preferable that a droplet jetting amount of the fluorescent ink is determined in the following processes (d) to (g), and the droplets of the fluorescent ink corresponding to the selected droplet jetting amount are jetted together with the color ink or after the droplets of the color ink are jetted. Here, the processes are (d) a process of generating patches of a plurality of ink image matters generated by varying a droplet jetting amount of each color ink and a droplet jetting amount of the fluorescent ink; (e) a process of color-measuring the target color and all the patches of the plurality of ink image matters; (f) a process of calculating differences between a colorimetric value of the target color and colorimetric values of all the patches for each color ink; and (g) a process of selecting a droplet jetting amount of each color ink and a droplet jetting amount of the fluorescent ink in which a colorimetric value difference becomes a minimum, for each color ink.

According to the invention, in inkjet printing with respect to a printing substrate medium (hereinafter, referred to as a medium), particularly, a chromatic color medium, with respect to a specific color in which color reproducibility cannot be ensured only using a color ink, by selecting and using a fluorescent ink suitable for realizing high color reproducibility, it is possible to ensure high color reproducibility with respect to the specific color.

Further, according to a preferred aspect of the invention, in addition to the above-mentioned effect, by jetting droplets of a fluorescent ink at an appropriate droplet jetting position with respect to a color ink, it is possible to ensure high color reproducibility with respect to a specific color.

Furthermore, according to a preferred aspect of the invention, in addition to the above-mentioned effects, by determining an appropriate droplet jetting amount of a fluorescent ink with respect to a color ink and jetting droplets of the fluorescent ink corresponding to the determined droplet jetting amount, it is possible to ensure high color reproducibility with respect to a specific color.

DESCRIPTION OF THE PREFERRED EMBODIMENTS

Hereinafter, an ink image matter generating method according to the invention will be described in detail with reference to preferred embodiments shown in the accompanying drawings.

(Medium)

First, a medium which is a printing substrate medium which is a target in an ink image matter generating method of the invention will be described.

A medium selected in the invention is provided for forming an ink image matter by jetting of droplets of a color ink and a fluorescent ink thereon using an inkjet printer. The medium used in the invention is not a medium such as inkjet paper or inkjet glossy paper with high whiteness, but is a medium which has low reproducibility for a specific color due to jetting of droplets of a color ink, or a medium which cannot secure color reproducibility for some specific colors only with a color ink. The medium used in the invention is not particularly limited, and any medium may be used as long as the medium can enhance and improve color reproducibility of such a specific color through jetting of droplets of a fluorescent ink suitable for the specific color. For example, printing paper with whiteness that is not so high may be used, and also, yellow printing paper may be used. Further, a chromatic color medium, for example, color printing paper, a special medium such as a cardboard (printing substrate medium), a building material, a cloth such as a nonwoven fabric or a textile, or the like may be used.

Among the above-mentioned medium, the chromatic color medium is preferable, the special medium is more preferable, and the cardboard is the most preferable.

In the ink image matter generating method of the invention, an inkjet printer for generating a color image by jetting droplets of a color ink and a fluorescent ink on a medium to generate an ink image matter is not particularly limited, and any inkjet printer may be used as long as it can jet droplets of a color ink and a fluorescent ink on a medium. For example, a known inkjet printer in the related art may be used.

Further, a colorimeter for measuring a reproduction color image of a target color generated on a medium using the target color (color patch) and the inkjet printer is not particularly limited, any colorimeter may be used as long as it can measure colorimetric values thereof.

Figure 1:
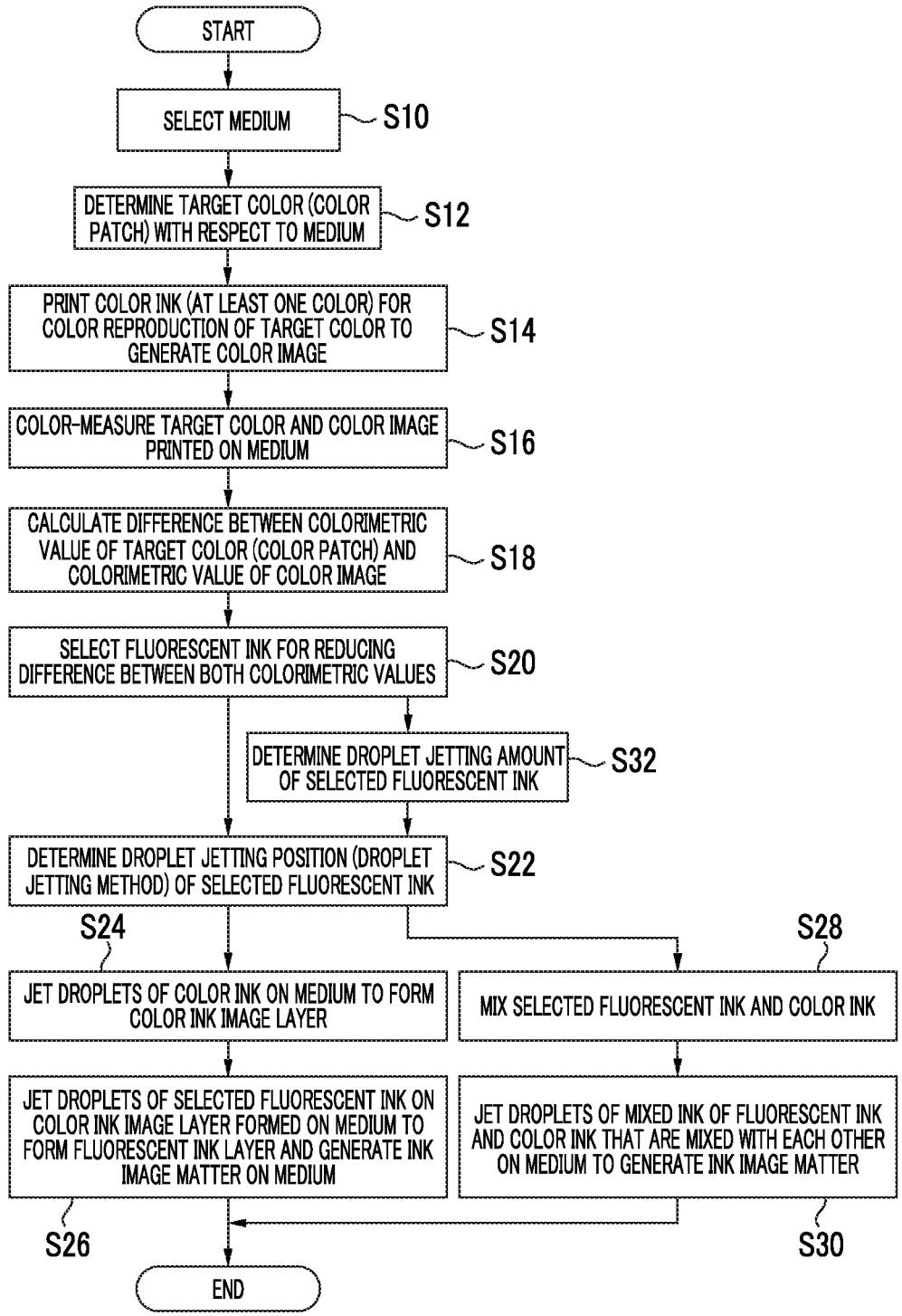
FIG. 1 is a flowchart showing an example of an ink image matter generating method according to an embodiment of the invention.
Figure 2:
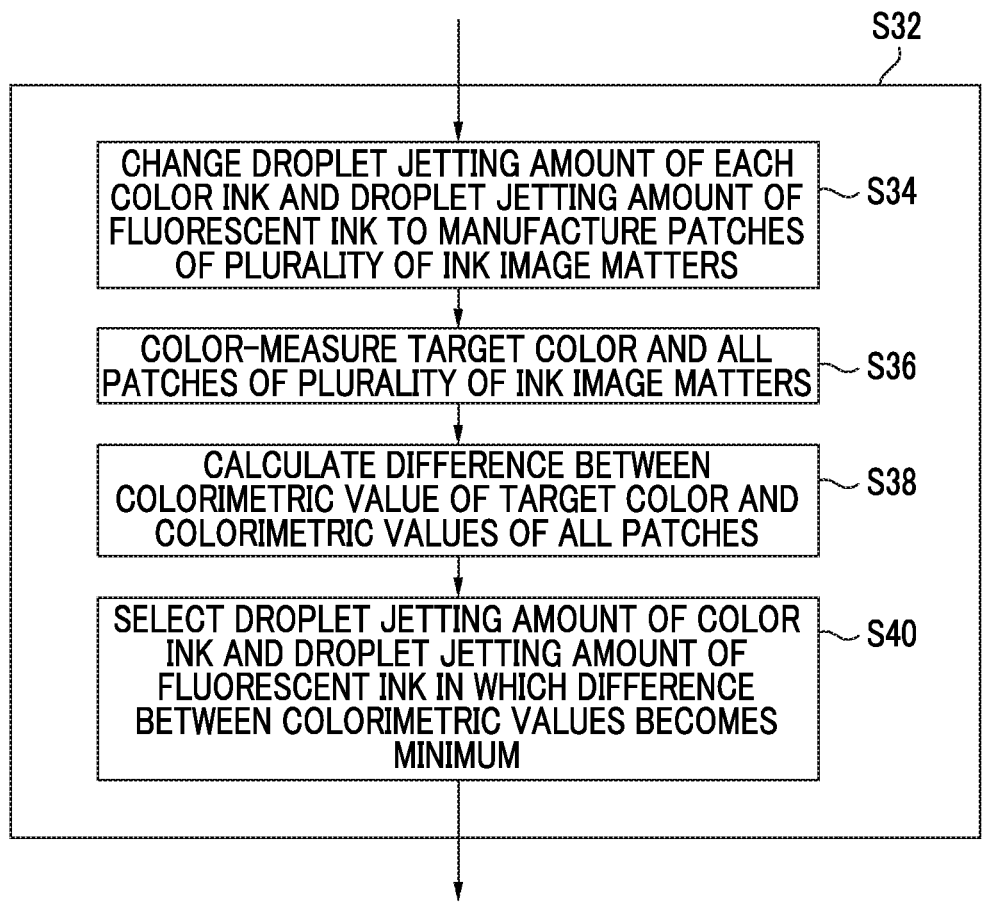
FIG. 2 is a diagram showing an example of a flow of a determination process of a droplet jetting amount of a fluorescent ink in the ink image matter generating method shown in FIG. 1.

FIG. 1 is a flowchart showing an example of an ink image matter generating method according to an embodiment of the invention. FIG. 2 is a flowchart showing an example of a flow of a determination process of a droplet jetting amount of a fluorescent ink in the ink image matter generating method shown in FIG. 1.

First, in step S10, a medium used for generating an ink image matter in the invention is selected. For example, a chromatic color medium, specifically, a cardboard is selected. In the following description, the chromatic color medium, specifically, the cardboard is described as a representative example of the selected medium, but the invention is not limited thereto, and any medium as described above may be used.

Then, in step S12, a target color is determined with respect to the selected medium in step S10. For example, magenta (M) is determined as the target color, and a magenta color patch (hereinafter, also referred to as a color patch) is selected. An example in which magenta is used as the target color is shown, but cyan (C) or yellow (Y) may be used as the target color, or a different color other than three primary colors of C, M, and Y may be used.

In the invention, the color patch used for determining the target color is not particularly limited, and any color patch may be used. Further, a known color chart or the like may be used. For example, ColorChecker made by X-Rite, Inc., ColorChart made by TOYO INK CO., LTD., or the like may be used. In a case where a cardboard is selected as the medium, it is preferable to use a color patch that at least includes regulated colors of specific 18 colors regulated as a standard for cardboard printing colors in the above-described JCS standard M0001-2000.

Then, in step S14, droplets of color inks for color reproduction of the target color determined in step S12 are jetted on the medium selected in step S10 using the inkjet printer to generate a monochromatic color image of the target color (reproduction color image). For example, in a case where the target color is magenta (M), inkjet printing is performed using a magenta ink (M) on a cardboard which is a chromatic color medium to generate a magenta monochromatic color image. In a case where cyan (C) or yellow (Y) is determined as the target color, inkjet printing may be performed using a cyan (C) ink or a yellow (Y) ink. Further, for example, in a case where green (G) is selected as the target color, a cyan (C) ink and a yellow (Y) ink may be used to generate a green (G) monochromatic color image. In a case where a different color is selected as the target color, inks with respective ink amounts capable of reproducing the target color on a standard white medium using at least droplets of two color inks of a cyan (C) ink, a magenta (M) ink, and a yellow (Y) ink may be jetted on a selected medium to generate a monochromatic color image.

Figure 9:
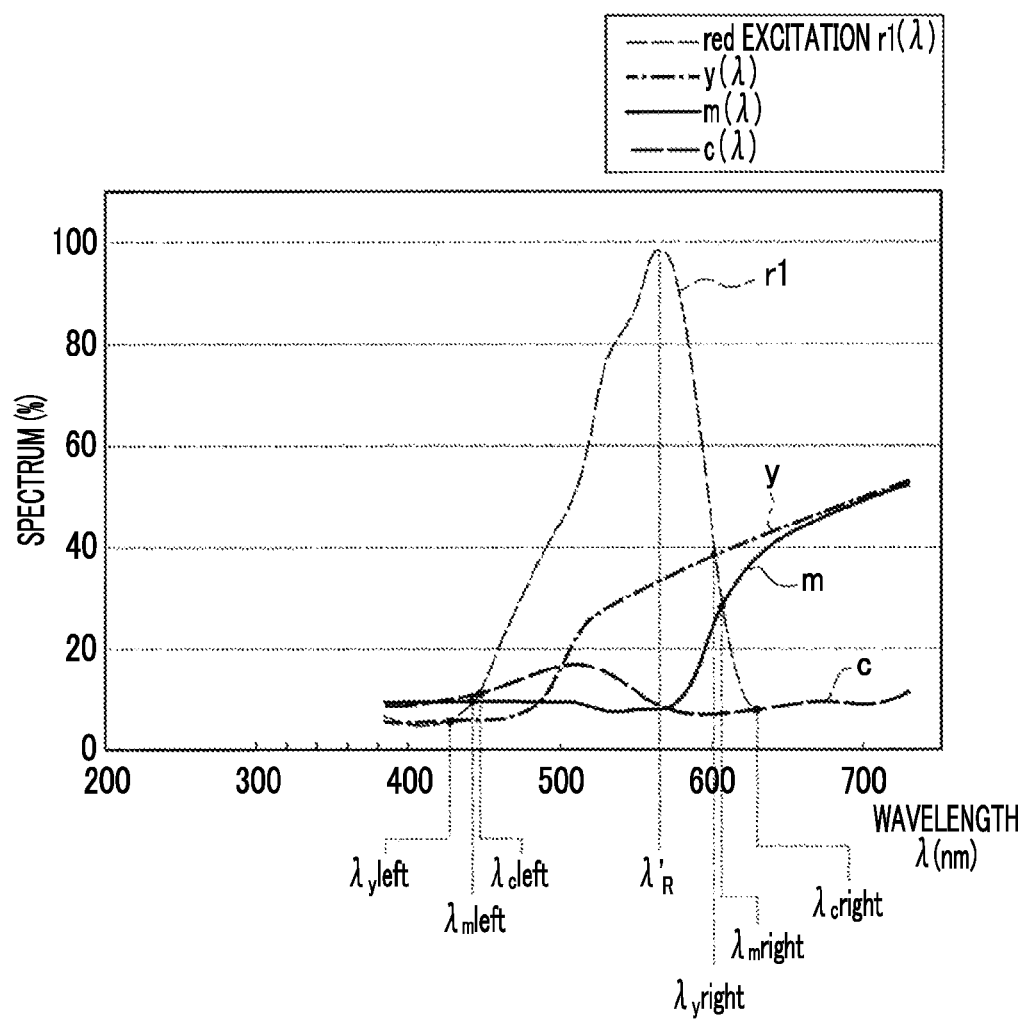
FIG. 9 is a graph showing examples of an excitation spectrum of one fluorescent ink and a reflection spectrum of three color inks shown in FIG. 3.

Here, the color inks may include three color inks of at least a cyan (C) ink, a magenta (M) ink, and a yellow (Y) ink, as shown in FIG. 9 (which will be described later), but in addition to these color inks, may include a color ink such as a light cyan ink, a light magenta ink, or a light yellow ink.

The three or more color inks may be provided as an ink set for an inkjet printer.

The color inks and the ink set used in the invention are not particularly limited, and may be a known color ink and a known ink set in the related art used in a known inkjet printer in the related art. For example, as well as an ink set of three types of color inks of a cyan (C) ink, a magenta (M) ink, and a yellow (Y) ink respectively having reflection spectrums c ($\lambda$), m ($\lambda$), and y ($\lambda$) shown in FIG. 9 (which will be described later), an aqueous pigment type inkjet ink, a UV curable inkjet ink, a solvent type inkjet ink, an aqueous dye type inkjet ink, or the like including light magenta (LM), light cyan (LC), or the like may be used.

Then, in step S16, the color patch of the target color determined in step S12 and the monochromatic color image generated in step S14 are respectively color-measured by a spectrophotometer. In step S16 corresponds to a color-measuring process (a) of the invention.

It is necessary that the color measurement of the color patch of the target color and the monochromatic color image (image color on the medium) is performed under the same color measurement condition, for example, under the same lighting condition or the like. For example, it is preferable that D50 or F8 is used as a light source when color-measuring the color patch of the target color and the monochromatic color image. Further, it is preferable that the color measurement is performed under the same illuminance.

Figure 3:
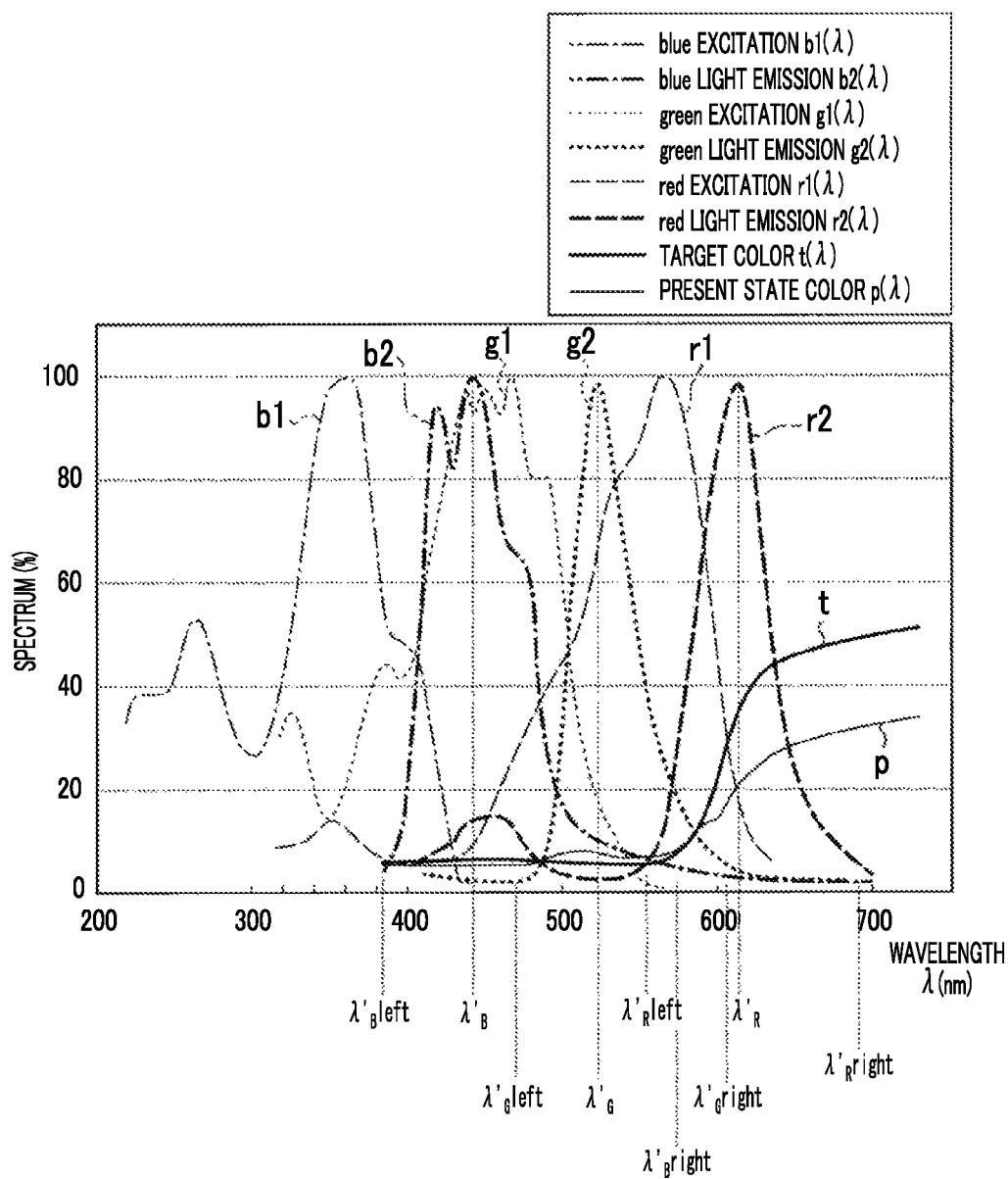
FIG. 3 is a graph showing examples of reflection spectrums of a target color and a present state color printed on a chromatic color medium used in the invention, and excitation spectrums and light emitting spectrums of a plurality of fluorescent inks, respectively.

For example, FIG. 3 shows, in a case where a target color is magenta (M) and a chromatic color image of the target color is generated on a predetermined chromatic color medium, an example of a color measurement result of a color patch of the target color and a monochromatic color image.

A spectral reflection spectrum t ($\lambda$) of a target color which is a spectral color measurement result of a color patch of the target color is represented by a graph indicated by a thick line in FIG. 3, and a spectral reflection spectrum p ($\lambda$) of a present state color which is a color measurement result of the current color of a monochromatic color image printed on a chromatic color medium is represented by a graph indicated by a thin solid line in FIG. 3.

Here, as shown in FIG. 3, since the reflection spectrum p (λ) of the current color is absorbed by a medium in a wavelength band of approximately 590 nm or longer, compared with the reflection spectrum t (λ) of the target color, the reflection spectrum p (λ) becomes lowered. Thus, coloring, and accordingly, color reproducibility deteriorates. For this reason, it can be understood that a difference between the reflection spectrum t (λ) of the target color and the reflection spectrum p (λ) of the current color is a reflection spectrum to be supplemented, and that a wavelength region where the difference exists is a wavelength region where the supplementation is necessary.

Figure 4A:
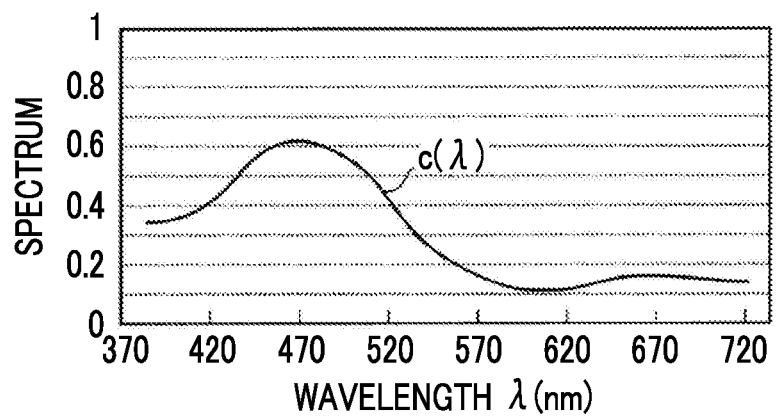
FIGS. 4A to 4C are graphs showing examples of reflection spectrums of a cyan ink, a chromatic color medium, and a cyan monochromatic color image on the medium, respectively.
Figure 4B:
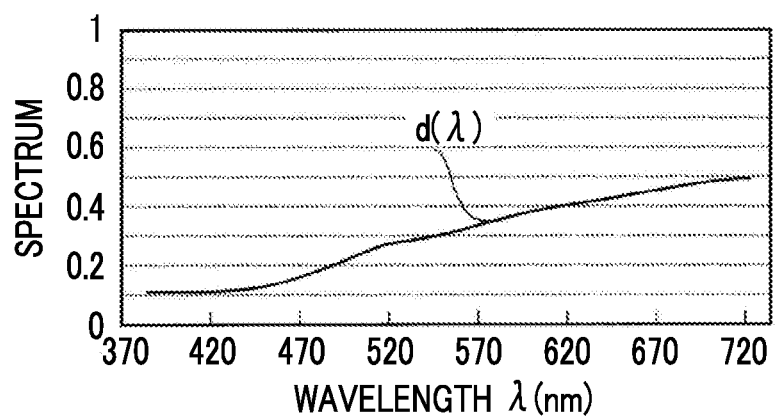
Figure 4C:
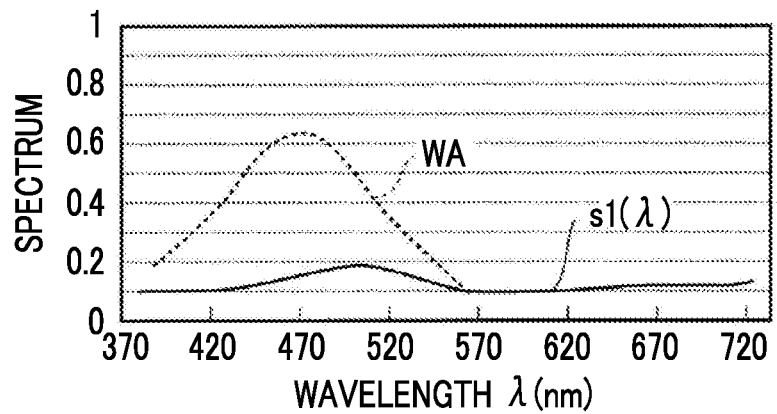

Further, if droplets of a cyan (C) ink having a reflection spectrum (spectral reflectance characteristic (distribution)) c (λ) shown in FIG. 4(A) are jetted on a cardboard, for example, to form a cyan monochromatic color image, the cardboard shows a yellowish ground color on a surface to be printed and has a reflection spectrum d (λ) shown in FIG. 4B, and thus, has a characteristic of absorbing short wavelength light. Thus, a cyan monochromatic color image having a reflection spectrum s1 (λ) indicated by a solid line in FIG. 4(c) is obtained by cooperation of both the characteristics. The reflectance characteristic s1(λ) of the cyan monochromatic color image shown in FIG. 4(C) is noticeably lowered in a short wavelength region, compared with the reflection spectrum c (λ) of the cyan ink shown in FIG. 4(A). In order to achieve sufficient cyan color reproduction, as indicated by a broken line in FIG. 4(C), it can be understood that it is necessary to further increase the reflection spectrum in a wavelength region WA of 380 nm to 570 nm.

Figure 5A:
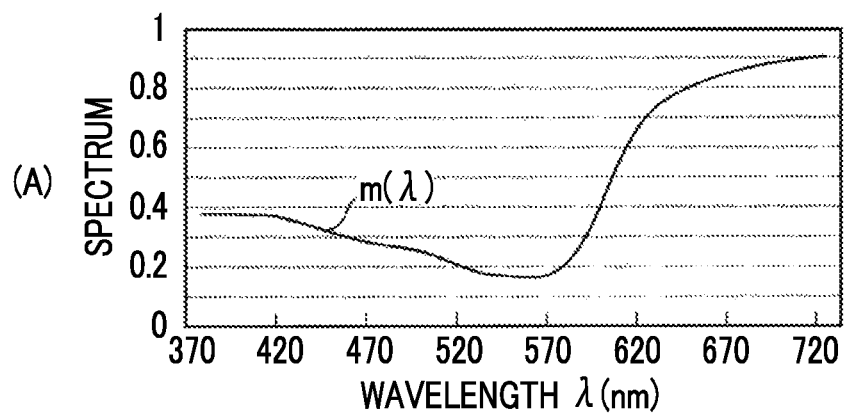
FIGS. 5A to 5C are graphs showing examples of reflection spectrums of a magenta ink, a chromatic color medium, and a magenta monochromatic color image on the medium, respectively.
Figure 5B:
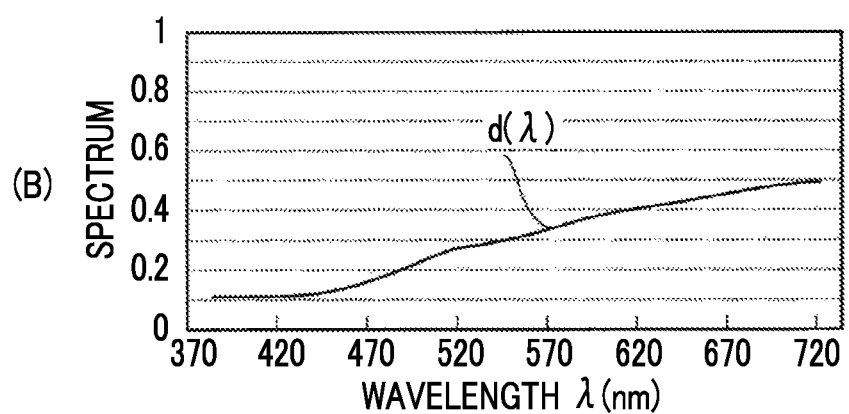
Figure 5C:
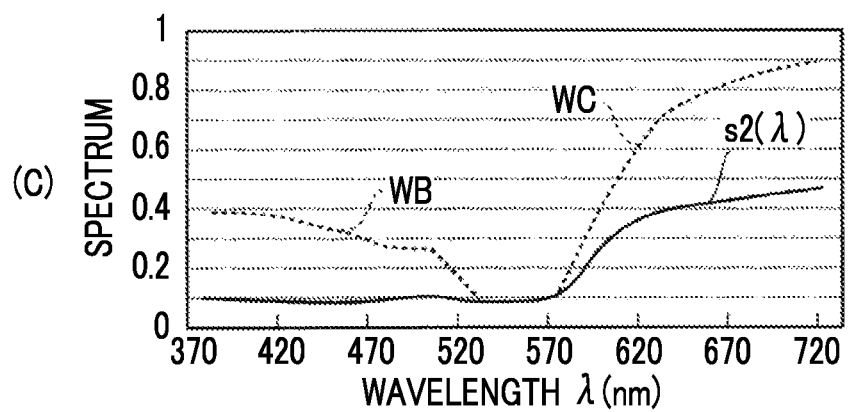

Further, similarly, if droplets of a magenta (M) ink having a reflection spectrum (spectral reflectance characteristic (distribution)) m (λ) shown in FIG. 5(A) are jetted on a cardboard to form a magenta monochromatic color image, the cardboard shows a yellowish ground color on a surface to be printed and has a reflection spectrum d (λ) shown in FIG. 5(B) in a similar way to FIG. 4(B), and thus, absorption occurs on a short wavelength side and a long wavelength side, and the cardboard becomes a magenta monochromatic color image having a reflection spectrum s2 (λ) indicated by a solid line in FIG. 5(C). The reflection spectrum s2 (λ) of the magenta monochromatic color image shown in FIG. 5(C) is lowered in a short wavelength region and a long wavelength region, compared with the reflection spectrum m (λ) of the magenta ink shown in FIG. 5(A), and thus coloring of magenta is not sufficient. For this reason, in order to achieve sufficient magenta color reproducibility, as indicated by a dot line in FIG. 5(C), it can be understood that it is necessary to further increase the reflection spectrum (reflectance characteristic) in a wavelength region WB on a short wavelength side of 380 nm to 530 nm and a wavelength region WC on a long wavelength side of 580 nm to 780 nm.

Here, the colorimeter used in the invention is not particularly limited, any known colorimeter may be used as long as it can spectrophotometrically measure a color patch of a target color and a monochromatic color image of a medium under the same conditions. For example, CM-2500c made by Konica Minolta, Inc., Ci60 made by X-Rite Inc., or the like may be used.

Then, in step S18, a difference between spectrocolorimetric values of the color patch of the target color and the monochromatic color image of the medium, spectrophotometrically measured in step S16, that is, a difference between spectral reflection spectrum distributions (reflectance characteristics) is calculated. Step S18 corresponds to a calculation process (b) of calculating a difference between colorimetric values in the invention.

Here, in the invention, for example, a difference between spectrocolorimetric values, that is, a difference ΔRsp between spectral reflection spectrum distributions (reflectance characteristics) is calculated with respect to each color of red R, green G, and blue B.

Here, it is assumed that three types of fluorescent inks of an R light emitting fluorescent ink, a G light emitting fluorescent ink, and a B light emitting fluorescent ink are respectively set in advance with respect to the respective colors of red R, green Q and blue B. Here, wavelengths of the respective colors of red R, green G, and blue B are respectively represented as $\lambda_R$, $\lambda_G$, and $\lambda_B$, and wavelengths in which a light emitting spectrum becomes a maximum with respect to the three types of fluorescent inks which are the R light emitting fluorescent ink, the G light emitting fluorescent ink, and the B light emitting fluorescent ink are respectively represented as $\lambda_R'$, $\lambda_G'$, and $\lambda_B'$. Further, the nearest wavelengths on a short wavelength side at the time of 2% of respective maximum light emitting spectrum values for the three types of fluorescent inks are represented as $\lambda_R'$left, $\lambda_G'$left, and $\lambda_B'$left, and the nearest wavelengths on a long wavelength side at the time of 2% of respective maximum light emitting spectrum values for the three types of fluorescent inks are represented as $\lambda_R'$right, $\lambda_G'$right, and $\lambda_B'$right.

Here, with respect to each color of red R, green G, and blue B, as a difference between spectrocolorimetric values of a color patch of a target color and a monochromatic color image of a medium, differences between reflection spectrums of the color patch of the target color and the monochromatic color image of the medium are respectively integrated in each wavelength band of $\lambda_R'\text{left} \leq \lambda_R \leq \lambda_R'\text{right}$, $\lambda_B'\text{left} \leq \lambda_B \leq \lambda_B'\text{right}$, and $\lambda_G'\text{left} \leq \lambda_G \leq \lambda_G'\text{right}$, so that three integrated differences of the respective colors of red R, green G, and blue B are calculated.

For example, as shown in FIG. 3, in a case where excitation (absorption) spectrums of the respective R light emitting fluorescent ink, G light emitting fluorescent ink, and B light emitting fluorescent ink are r1 (λ), g1 (λ), and b1 (λ) and light emitting spectrums thereof are r2 (λ), g2 (λ), and b2 (λ), the wavelengths $\lambda_R'$, $\lambda_G'$, and $\lambda_B'$ in which the light emitting spectrum becomes a maximum become 612 nm ($\lambda_R'$=612 nm), 520 nm ($\lambda_G'$=520 nm), and 441 nm ($\lambda_B'$=441 nm), and the nearest wavelengths $\lambda_R'$left and $\lambda_R'$right on both the short wavelength side and the long wavelength side at the time of 2% of the maximum light emitting spectrum values become 552 nm and 693 nm, the wavelengths $\lambda_B'$left and $\lambda_B'$right thereon become 483 nm and 407 nm, and the wavelengths $\lambda_G'$left and $\lambda_G'$right thereon become 385 nm and 576 nm.

In the example shown in FIG. 3, three integrated differences ΔRi, ΔGi, and ΔBi of the respective colors of red R, green G, and blue B may be calculated by the following expressions (1), (2), and (3), respectively.

[Expression 1]

$$\Delta Ri = \int_{\lambda_R'\text{left}}^{\lambda_R'\text{right}} |t(\lambda) - p(\lambda)| d\lambda = \int_{552\ nm}^{693\ nm} |t(\lambda) - p(\lambda)| d\lambda = 161.4 \qquad (1)$$

$$\Delta Gi = \int_{\lambda_G'\text{left}}^{\lambda_G'\text{right}} |t(\lambda) - p(\lambda)| d\lambda = \int_{453\ nm}^{607\ nm} |t(\lambda) - p(\lambda)| d\lambda = 33.9 \qquad (2)$$

$$\Delta Bi = \int_{\lambda_B'\text{left}}^{\lambda_B'\text{right}} |t(\lambda) - p(\lambda)| d\lambda = \int_{385\ nm}^{576\ nm} |t(\lambda) - p(\lambda)| d\lambda = 21.8 \qquad (3)$$

In the invention, instead of calculating three integrated differences of the respective colors of red R, green G, and blue B, as a difference between spectrocolorimetric values of a color patch of a target color and a monochromatic color image of a medium with respect to each color of red R, green G, and blue B, one representative wavelength of each color of red R, green G, and blue B, for example, a difference between reflection spectrums of the color patch of the target color and the monochromatic color image of the medium may be obtained (calculated) in the respective wavelength bands at each of the wavelengths $\lambda_R'$ ($\lambda_R=\lambda_R'$), $\lambda_G'$ ($\lambda_G=\lambda_G'$), and $\lambda_B'$ ($\lambda_B=\lambda_B'$) in which each of the light emitting spectrums of three types of fluorescent inks corresponding to the respective colors becomes a maximum, and thus, three short color wavelength differences of the respective colors of red R, green G, and blue B may be calculated.

In the example shown in FIG. 3, since the wavelengths $\lambda_R'$, $\lambda_G'$, and $\lambda_B'$ in which the light emitting spectrum becomes a maximum are 612 nm, 520 nm, and 441 nm, respectively, three short wavelength differences $\Delta Rs$, $\Delta Gs$, and $\Delta Bs$ of the respective colors of red R, green G, and blue B may be calculated by the following expressions (4), (5), and (6), respectively.

[Expression 2]

$$\Delta Rs = |t(\lambda_R') - p(\lambda_R')| = |t(612 \text{ nm}) - p(612 \text{ nm})| = 13.1 \quad (4)$$

$$\Delta Gs = |t(\lambda_G') - p(\lambda_G')| = |t(520 \text{ nm}) - p(520 \text{ nm})| = 1.9 \quad (5)$$

$$\Delta Bs = |t(\lambda_B') - p(\lambda_B')| = |t(441 \text{ nm}) - p(441 \text{ nm})| = 1.1 \quad (6)$$

In the above-described example, three integrated differences of the respective colors of red R, green G, and blue B and three short wavelength differences are calculated with reference to the light emitting spectrums of three types of fluorescent inks corresponding to the respective colors of red R, green G, and blue B, but the invention is not limited thereto. For example, wavelengths for calculating three short wavelength differences of the respective colors of red R, green G, and blue B may be fixed to single wavelengths $\lambda_R=700.0$ nm, $\lambda_G=546.1$ nm, and $\lambda_B=435.8$ nm of red R, green G, and blue B. Further, respective wavelength regions for calculating three integrated differences of the respective colors of red R, green (G and blue B may be fixed to 546.1 nm$\leq \lambda_R \leq$780.0 nm, 435.8 nm$\leq \lambda_G \leq$700.0 nm, and 380.0 nm$\leq \lambda_B \leq$546.1 nm, or may be fixed to 595 nm$\leq \lambda_R \leq$750 nm, 490 nm$\leq \lambda_G$595 nm, and 435 nm$\leq \lambda_B \leq$490 nm. Wavelength bands other than the above-described wavelength regions may be set as long as they are suitable for calculating three integrated differences of the respective colors and three short wavelength differences.

In addition, in the above-described example, three types of fluorescent inks of the R light emitting fluorescent ink, the G light emitting fluorescent ink, and the B light emitting fluorescent ink corresponding to the respective colors of red R, green G, and blue B are set in advance, but the invention is not limited thereto, and as long as respective colors and fluorescent inks correspond to each other, various colors of three colors or more may be selected, or various fluorescent inks corresponding thereto may be selected and set in advance.

Then, in step S20, a fluorescent ink for reducing the difference between the spectrocolorimetric values of the color patch of the target color and the monochromatic color image of the medium calculated in step S18, that is, the difference between the spectral reflection spectrum distributions (reflectance characteristics) is selected. Step S20 corresponds to a process (c) of selecting a fluorescent ink in the invention.

In the example shown in FIG. 3, the three integrated differences $\Delta Ri$, $\Delta Gi$, and $\Delta Bi$ of the respective colors of red R, green G, and blue B are 161.4, 33.9, and 21.8, and the largest integrated difference is the integrated difference $\Delta Ri$ of red R, which is 161.4. Accordingly, in order to reduce the largest integrated difference $\Delta Ri$ of red R, the R light emitting fluorescent ink which is a fluorescent ink corresponding to the wavelength band of red R in which the integrated difference is the largest (excitation wavelength band or light emitting wavelength band).

Even in a case where three short wavelength differences $\Delta Rs$, $\Delta Gs$, and $\Delta Bs$ of the respective colors of red R, green G, and blue B are used, since their values are 13.1, 1.9, and 1.1, respectively, in order to reduce the short wavelength difference $\Delta Rs$ of the largest red R, the R light emitting fluorescent ink which is a fluorescent ink corresponding to the wavelength band of red R in which the short wavelength difference is the largest (excitation wavelength band or light emitting wavelength band) may be selected.

In the above-described example, a fluorescent ink corresponding to a wavelength region of a color having the largest integrated difference or short wavelength difference among integrated differences or short wavelength differences of the respective colors, for example, the R light emitting fluorescent ink in the example shown in FIG. 3 is selected, but the invention is not limited thereto, and a plurality of fluorescent inks respectively corresponding to wavelength regions of a plurality of colors with differences may be selected.

For example, in the example shown in FIG. 4(C), a wavelength region with a large difference, in which supplement is necessary, is the wavelength region WA on the short wavelength side, and in an example shown in FIG. 5(C), a wavelength region with a larger difference, in which supplement is necessary, is the wavelength region WC on the long wavelength side, and thus, fluorescent inks corresponding to these wavelength regions, for example, the B light emitting fluorescent ink and the R light emitting fluorescent ink may be selected, respectively. However, in the example shown in FIG. 5(C), as a wavelength region with a difference, although the difference is smaller than that in the wavelength region WC on the long wavelength side, in which supplement is necessary, there is also the wavelength region WB on the short wavelength side. Accordingly, in the case of the example shown in FIG. 5(C), two fluorescent inks of the B light emitting fluorescent ink corresponding to the wavelength region WB on the short wavelength side in addition to the R light emitting fluorescent ink corresponding to the wavelength region WC on the long wavelength side may be selected.

Then, in step S22, a droplet jetting position or a droplet jetting method for causing the fluorescent ink selected in step S20 to exist on a surface of an ink image matter is determined.

In the invention, the droplet jetting position of the fluorescent ink may be a position on a color ink, or may be a position in the color ink. In other word, the droplet jetting method may be a method for jetting droplets of a fluorescent ink on a color ink on a medium, or may be a method for mixing a fluorescent ink with a color ink and jetting of droplets of a mixed ink of the fluorescent ink and the color ink on a medium.

In the invention, in order to supplement deterioration in coloring of a specific color in color printing due to a color of a surface to be printed of a medium, particularly, due to a color of a surface to be printed of a chromatic color medium, or to supplement deterioration in color reproducibility due to reduction in reflectance, color reproducibility is enhanced by further increasing the reflectance of the specific color by a fluorescent ink. Thus, in the invention, it is necessary to cause a fluorescent ink to exist on a surface of an ink image matter based on a color ink. In the invention, the process of causing the fluorescent ink to exist on the surface of the ink image matter based on the color ink is performed to cause the fluorescent ink to be absorbed as much as possible before light having a wavelength component necessary for light emission of the fluorescent ink is absorbed into the color ink in the ink image matter.

Figure 6A:
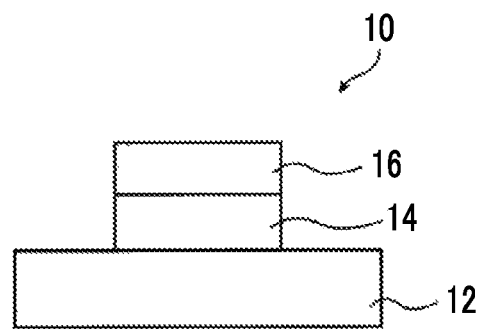
FIGS. 6A and 6B are sectional views schematically showing configurations of ink image matters generated by the method of the invention.

Then, in step S24, in a case where the droplet jetting position or the droplet jetting method determined in step S22 corresponds to the jetting of droplets of the fluorescent ink onto the color ink on the medium, as shown in FIG. 6(A), predetermined color inks, for example, droplets of three types of color inks of a cyan (C) ink, a magenta (M) ink, and a yellow (Y) ink are respectively jetted on a medium 12 by a predetermined amount to form a color ink image layer 14.

Then, in step S26, as shown in FIG. 6(A), droplets of the fluorescent ink selected in step S20 are jetted on the color ink image layer 14 formed on the medium 12 in step S24 by a predetermined amount to form a fluorescent ink layer 16, so that an ink image matter 10 formed by the color ink image layer 14 and the fluorescent ink layer 16 are generated on the medium 12.

On the other hand, in step S28, in a case where the droplet jetting position or the droplet jetting method determined in step S22 corresponds to the jetting of droplets of the mixed ink of the fluorescent ink and the color ink on the medium, predetermined color inks, for example, a predetermined amount of each of three types of color inks of a cyan (C) ink, a magenta (M) ink, and a yellow (Y) ink and a predetermined amount of the fluorescent ink selected in step S20 are mixed in advance to manufacture a mixed ink, for example, three types of mixed inks for three types of color inks.

Figure 6B:
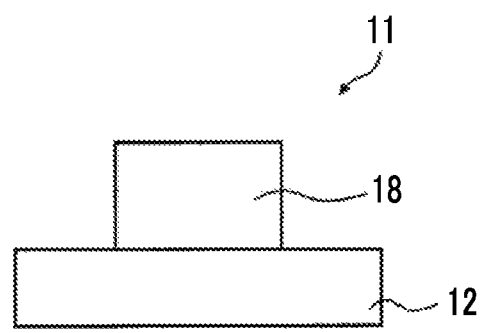

Then, in step S30, as shown in FIG. 6(B), droplets of the mixed inks manufactured in step S28, for example, droplets of three types of mixed inks for three types of color inks are jetted onto the medium 12 to form a mixed ink layer 18, so that an ink image matter 11 formed by the mixed ink layer 18 is generated on the medium 12.

In this way, according to the ink image matter generating method of the invention, it is possible to generate an ink image matter in which high color reproducibility is secured with respect to a specific color in a specific wavelength region in which supplement is necessary, for example, to generate the ink image matters 10 and 11 shown in FIGS. 6(A) and 6(B).

For example, a cyan monochromatic color image formed by jetting droplets of a cyan ink having the reflection spectrum c (λ) shown in FIG. 4(A) on a cardboard having the reflection spectrum d (λ) shown in FIG. 4(B) shows the reflection spectrum s1 (λ) shown in FIG. 4(C).

Figure 7A:
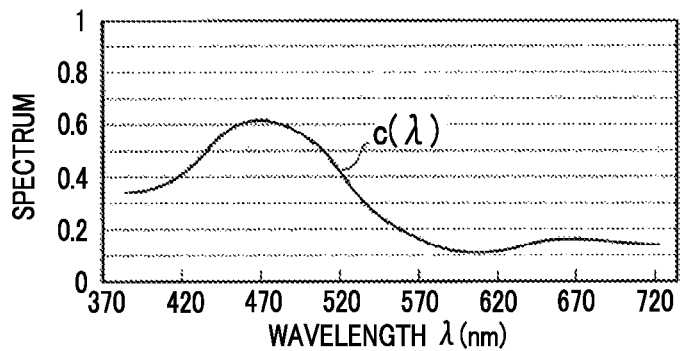
FIGS. 7A to 7D are graphs showing examples of a reflection spectrum of a cyan ink, a excitation spectrum of a fluorescent ink, a reflection spectrum of a chromatic color medium, and a reflection spectrum of a cyan monochromatic color ink image matter on the medium, respectively.
Figure 7B:
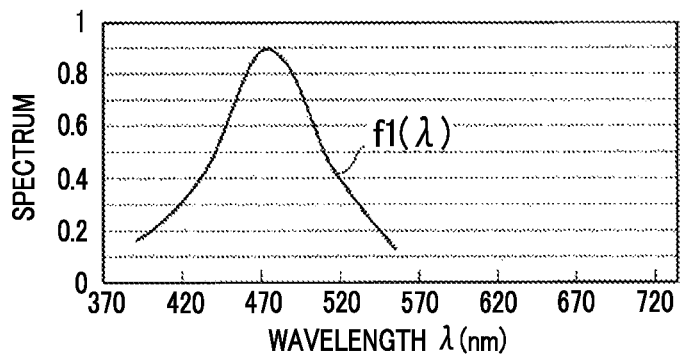
Figure 7C:
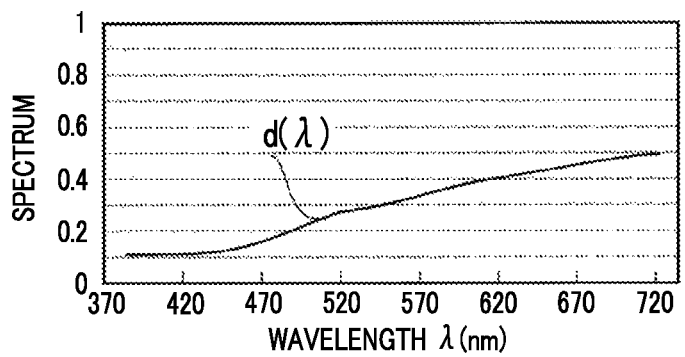

Thus, using a fluorescent ink having an excitation spectrum f1 (λ) shown in FIG. 7(B) for further increasing the reflectance characteristic of the wavelength region WA in which supplement is necessary, indicated by the dot line in FIG. 4(C), for example, a B light emitting fluorescent ink, in addition to the cyan ink having the reflection spectrum (reflectance characteristic) c (λ) shown in FIG. 7(A) which is the same as in FIG. 4(A), a cyan monochromatic color image is generated as the ink image matters 10 and 11 shown in FIGS. 6(A) and 6(B) on a cardboard having the reflection spectrum d (λ) shown in FIG. 7(C) which is the same as in FIG. 4(B).

Figure 7D:
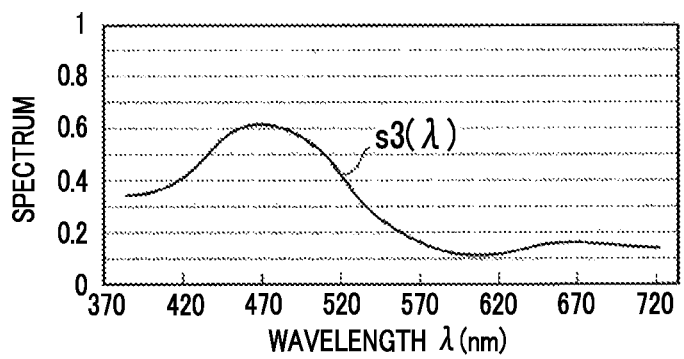

It can be understood that the cyan monochromatic color image supplemented by the fluorescent ink, generated in this way, is an ink image having a reflection spectrum s3 (λ) shown in FIG. 7(D), is an ink image matter which is the same as or similar to the reflection spectrum c (λ) of the cyan ink shown in FIG. 7(A), and is an ink image that sufficiently enhances the reflectance characteristic of the wavelength region WA in which supplement is necessary, indicated by the dot line in FIG. 4(C), secures color reproducibility of a specific color corresponding to the wavelength region WA sufficiently highly, and has good visibility.

Further, a cyan monochromatic color image formed by jetting droplets of a cyan ink image having the reflection spectrum m (λ) shown in FIG. 5(A) on the cardboard having the reflection spectrum d (λ) shown in FIG. 5(B) becomes the reflection spectrum s2 (λ) shown in FIG. 5(C).

Figure 8A:
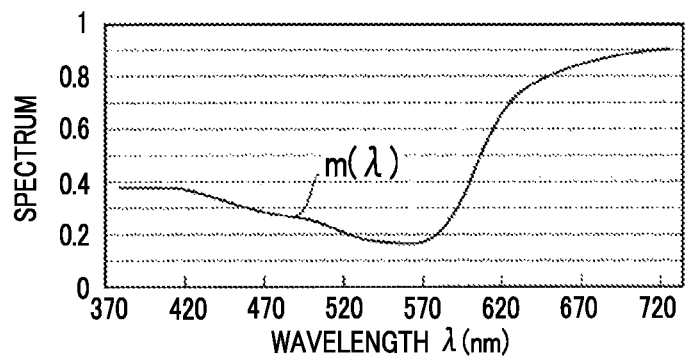
FIGS. 8A to 8D are graphs showing examples of a reflection spectrum of a magenta ink, an excitation spectrum of a fluorescent ink, a reflection spectrum of a chromatic color medium, and a reflection spectrum of a magenta monochromatic color ink image matter on the medium, respectively.
Figure 8B:
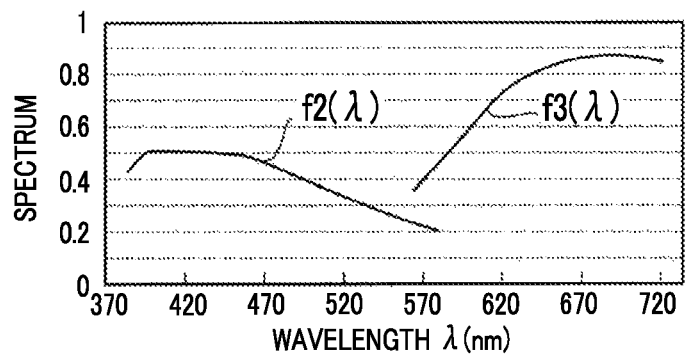
Figure 8C:
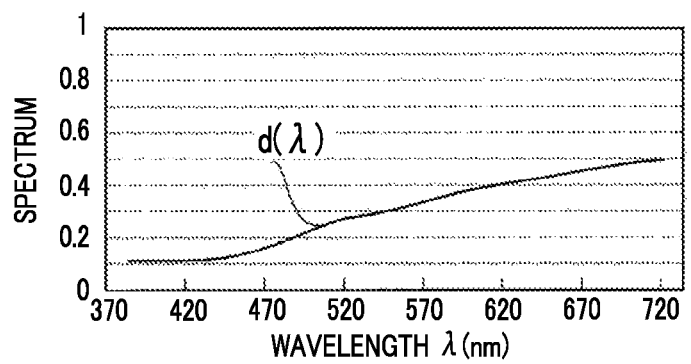

Thus, using a fluorescent ink having excitation spectrums f2 (λ) and f3 (λ) shown in FIG. 8(B) for further increasing the reflectance characteristics of the wavelength regions WB and WC in which supplement is necessary, indicated by the dot line in FIG. 5(C), for example, a B light emitting fluorescent ink and an R light emitting fluorescent ink, in addition to the magenta ink having the reflection spectrum m (λ) shown in FIG. 8(A) which is the same as in FIG. 5(A), a magenta monochromatic color image is generated as the ink image matters 10 and 11 shown in FIGS. 6(A) and 6(B) on a cardboard having the reflection spectrum d (λ) shown in FIG. 8(C) which is the same as in FIG. 5(B).

Figure 8D:
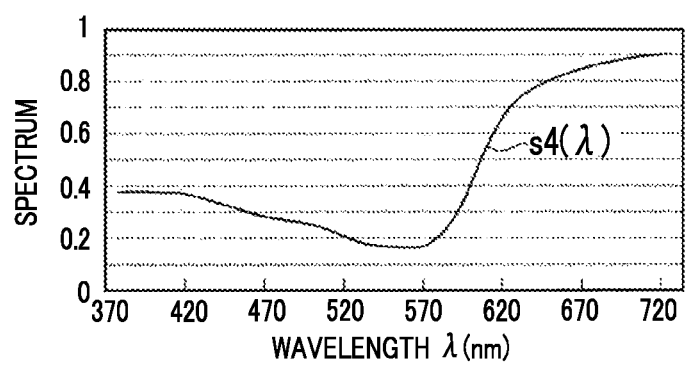

It can be understood that the magenta monochromatic color image supplemented by the fluorescent ink, generated in this way, is an ink image having a reflection spectrum s4 (λ) shown in FIG. 8(D), is an ink image matter which is the same as or similar to the reflection spectrum m (λ) of the magenta ink shown in FIG. 8(A), and is an ink image that sufficiently enhances the reflectance characteristic of the wavelength region WA in which supplement is necessary, indicated by the dot line in FIG. 5(C), secures color reproducibility of a specific color corresponding to each of the wavelength regions WA and WC sufficiently highly, and has good visibility.

Hence, the ink image matter generating method of the invention is terminated.

However, in the invention, it is preferable to select whether to jet droplets of the fluorescent ink selected in the above-described step S20 according to the color ink used in step S24, for example, depending on whether a region where the droplets of the fluorescent ink are jetted is a region where droplets of one color ink among a plurality of color inks are jetted or a region where the droplets of the color ink are not jetted.

In the invention, among every two intersections between an excitation spectrum of the selected fluorescent ink and a reflection spectrum of each color ink among a plurality of color inks for generating an ink image matter, a wavelength of the nearest intersection on a short wavelength side when seen from a maximum wavelength in which the excitation spectrum of the fluorescent ink becomes a maximum is represented as $\lambda_{color}$left, and a wavelength of the nearest intersection on a long wavelength side when seen from the maximum wavelength is represented as $\lambda_{color}$right.

Here, a difference between the excitation spectrum of the selected fluorescent ink and the reflection spectrum of each color ink among the plurality of color inks is integrated in a wavelength band of $\lambda_{color}\text{left} \leq \lambda_{color} \leq \lambda_{color}\text{right}$ to calculate integrated differences corresponding to the number of the plurality of color inks.

When one color ink having the largest value among the integrated differences is referred to as a color ink A and the other one or more color inks are referred to as a color ink B, in step S30, as a fluorescent ink droplet jetting method which is most preferentially performed, with respect to the color ink A, it is preferable to use a method for jetting a fluorescent ink in a region where droplets of the color ink A are not jetted, and with respect to the color ink B, it is preferable to jet droplets of a fluorescent ink in a region where droplets of the color ink B are jetted after the droplets of the color ink B are jetted, or it is preferable to jet the fluorescent ink as a mixed ink together with the color ink B.

In this way, according to the invention, it is possible to cause a fluorescent ink to exist on a surface of an ink image matter.

Further, in a case where a color difference between the color of the ink image matter obtained by performing the droplet jetting method of the fluorescent ink which is most preferentially performed, that is, the color of the ink image matter in which droplets of a plurality of color inks and droplets of fluorescent inks for color reproduction of a target color are jetted on a medium to be printed and the target color is larger than a target color difference, with respect to the color ink A, the droplets of the fluorescent ink may be jetted in a region where the droplets of the color ink A are jetted, in addition to a region where the droplets of the color ink A are not jetted, after the droplets of the color ink A are jetted, or the droplets of the fluorescent ink may be jetted as a mixed ink together with the color ink A. In this way, the fluorescent ink may be caused to exist on the surface of the ink image matter.

For example, if the plurality of color inks used in the invention are three types of color inks of the cyan (C) ink, the magenta (M) ink, the yellow (Y) ink, the three types of color inks have the reflection spectrums c ($\lambda$), m ($\lambda$), and y ($\lambda$) shown in FIG. 9, respectively, and the fluorescent ink selected in the above-described step S20 is the red (R) light emitting fluorescent ink shown in FIG. 3 and has the excitation spectrum r1 ($\lambda$) shown in FIGS. 3 and 9, the droplet jetting method of the fluorescent ink which is most preferentially performed may be performed as follows.

In the example shown in FIG. 9, the wavelengths of the respective colors of cyan C, magenta M, and yellow Y are represented as $\lambda_c$, $\lambda_m$, and $\lambda_y$, respectively.

Further, among every two intersections between the excitation spectrum r1 ($\lambda$) of the red light emitting fluorescent ink and each of the reflection spectrums c ($\lambda$), m ($\lambda$), and y ($\lambda$) of the respective color inks of three types of color inks of the cyan (C) ink, the magenta (M) ink, and the yellow (Y) ink for generating an ink image matter, wavelengths of the nearest intersections on the short wavelength side when seen from a maximum wavelength $\lambda_R'$ in which the excitation spectrum r1 ($\lambda$) of the red light emitting fluorescent ink becomes a maximum are represented as $\lambda_c\text{left}$, $\lambda_m\text{left}$, and $\lambda_y\text{left}$, respectively, and wavelengths of the nearest intersections on the long wavelength side when seen from the maximum wavelength $\lambda_R'$ are represented as $\lambda_c\text{right}$, $\lambda_m\text{right}$, and $\lambda_y\text{right}$, respectively.

Here, differences between the excitation spectrum r1 ($\lambda$) of the red light emitting fluorescent ink and the reflection spectrums c ($\lambda$), m ($\lambda$), and y ($\lambda$) of the respective color inks of three types of color inks of cyan (C) ink, magenta (M) ink, and yellow (Y) ink are integrated in respective wavelength bands of $\lambda_c\text{left} \leq \lambda_c \leq \lambda_c\text{right}$, $\lambda_m\text{left} \leq \lambda_m \leq \lambda_m\text{right}$, and $\lambda_y\text{left} \leq \lambda_y \leq \lambda_y\text{right}$ to calculate integrated differences $\Delta c$, $\Delta m$, and $\Delta y$ for the three types of color inks of the cyan (C) ink, the magenta (M) ink, and the yellow (Y) ink, respectively.

In the example shown in FIG. 9, $\lambda_c\text{left}$, $\lambda_m\text{left}$, and $\lambda_y\text{left}$ are 448 nm, 445 nm, and 429 nm, respectively, and $\lambda_c\text{right}$, $\lambda_m\text{right}$, and $\lambda_y\text{right}$ are 632 nm, 608 nm, and 601 nm, respectively. The integrated differences $\Delta c$, $\Delta m$, and $\Delta y$ for the three types of color inks of the cyan (C) ink, the magenta (M) ink, and the yellow (Y) ink can be calculated by the following expressions (7), (8), and (9), respectively.

[Expression 3]

$$\Delta c = \int_{\lambda_c\text{left}}^{\lambda_c\text{right}} (r_1(\lambda) - c(\lambda)) d\lambda = \int_{448\,nm}^{632\,nm} (r_1(\lambda) - c(\lambda)) d\lambda = 752.6 \quad (7)$$

$$\Delta m = \int_{\lambda_m\text{left}}^{\lambda_m\text{right}} (r_1(\lambda) - m(\lambda)) d\lambda = \int_{445\,nm}^{608\,nm} (r_1(\lambda) - m(\lambda)) d\lambda = 764.5 \quad (8)$$

$$\Delta y = \int_{\lambda_y\text{left}}^{\lambda_y\text{right}} (r_1(\lambda) - y(\lambda)) d\lambda = \int_{429\,nm}^{601\,nm} (r_1(\lambda) - y(\lambda)) d\lambda = 567.9 \quad (9)$$

Since the integrated difference $\Delta m$ among the three integrated differences $\Delta c$, $\Delta m$, and $\Delta y$ is the largest integrated difference, the magenta ink corresponds to the above-described color ink A. In the magenta ink, since an absorption region of magenta in the reflection spectrum m ($\lambda$) and an excitation region of an excitation spectrum of the red light emitting fluorescent ink overlap each other, it can be understood that red light emitting fluorescent excitation does not easily occur and an effect of fluorescent light emission is lowered compared with other color inks corresponding to the above-described color ink B, for example, the cyan ink and the yellow ink. That is, with respect to the magenta ink, even if droplets of the magenta ink and droplets of the fluorescent ink are mixed and jetted, or even if the droplets of the fluorescent ink are jetted after the droplets of the magenta ink are jetted, since absorbed light (excited light) necessary for light emission of the fluorescent ink is absorbed by the magenta ink, sufficient light absorption cannot be performed, and thus, light emission of fluorescence is not effectively performed.

Thus, in the invention, as the droplet jetting method of the fluorescent ink which is most preferentially performed, a method for jetting droplets of the fluorescent ink in the region where the droplets of the magenta ink are not jetted, only with respect to the magenta ink, to promote coloring in a magenta region using the fluorescent ink. On the other hand, with respect to the cyan ink and the yellow ink other than the magenta ink, a method for mixing the magenta ink with the fluorescent ink for jetting in regions where droplets of the cyan ink and droplets of the yellow ink are respectively jetted may be used, or a method for jetting droplets of the magenta ink and then jetting droplets of the fluorescent ink in an overlapping manner may be used.

With such a configuration, by dropping a fluorescent ink in a region where a color ink is not dropped only with respect to the color ink in which an effect of the selected fluorescent ink is not easily achieved, it is possible to effectively use fluorescence as much as possible, without increasing a droplet jetting amount of the fluorescent ink.

However, in a case where a color difference between a present state color of an ink image matter and a target color is still large even using such a droplet jetting method, a fluorescent ink may also be mixed in a region where the color ink is dropped, in addition to a region where a color ink in which an effect of the fluorescent ink is not easily achieved, or may be dropped in an overlapping manner, to thereby fill the color difference to be reduced.

For example, in the example shown in FIG. 9, in a case where the color difference between the present state color of the obtained ink image matter and the target color is still larger than the target color difference even if the droplet jetting method of the fluorescent ink which is most preferentially performed is performed, in order to make the color difference close to the target color difference, with respect to the magenta ink, the droplets of the fluorescent ink may be jetted after the droplets of the magenta ink are jetted in the region where the droplets of the magenta ink are jetted, in addition to the region where the droplets of the magenta ink are not jetted, or may be jetted as a mixed ink together with the magenta ink. In this way, the fluorescent ink may be caused to exist on the surface of the ink image matter.

In the above-described example, the droplet jetting amount of the fluorescent ink is set as an amount which is appropriately set in advance, but the invention is not limited thereto. For example, the droplet jetting amount of the fluorescent ink may be determined according to the droplet jetting amount of the color ink of the generated ink image matter, and the droplets of the fluorescent ink of the determined droplet jetting amount may be jetted together with the color ink or after the droplets of the color ink are jetted.

In the invention, in step S20, after the fluorescent ink for reducing a difference between spectrocolorimetric values of the target color and the present state color is selected, and before the droplet jetting position or the droplet jetting method of the fluorescent ink is determined in step S22, the droplet jetting amount of the fluorescent ink may be determined in step S32 shown in FIGS. 1 and 2. That is, as shown in FIG. 2, it is preferable to perform the determination process of the droplet jetting amount of the fluorescent ink in step S32 between step S20 and step S22.

In the invention, it is preferable to perform the determination process of the droplet jetting amount of the fluorescent ink in step S32 shown in FIG. 2 as follows.

First, in step S34, after the fluorescent ink is selected in step S20, patches of a plurality of ink image matters generated (manufactured) by varying a droplet jetting amount of each color ink and a droplet jetting amount of the selected fluorescent ink are generated.

Here, a generation process of the patches of the ink image matters in which the droplet jetting amounts of each color ink and the fluorescent ink are varied in step S34 of the invention may be performed in the same way according to a process of forming the color ink image layer 14 in step S24 and a process of forming the fluorescent ink layer 16 in step S26, or according to a process of mixing the color ink and the fluorescent ink in step S28 and a process of forming the mixed ink layer 18 in step S30. Step S34 corresponds to a process (d) of generating a patch of an ink image matter.

Then, in step S36, (a color patch of) the target color determined in step S12 and all the patches of the plurality of ink image matters generated in step S34 are color-measured.

Here, a process of color-measuring the target color and the patches of the ink image matters in step S36 may be performed in the same way according to the process of color-measuring in step S16. Step S36 corresponds to a process (e) of color-measuring a target color and patches of ink image matters in the invention.

Then, step S38, a difference between a colorimetric value of (the color patch of) the target color and colorimetric values of all the patches of the plurality of ink image matters color-measured in step S36 is calculated for each color ink.

Here, a process of calculating the colorimetric value difference between the target color and the patches of the ink image matters in step S38 of the invention may be performed in the same way according to the process of calculating the colorimetric value difference in step S18. Step S38 corresponds to a process (f) of calculating a colorimetric value difference between a target color and patches of ink image matters in the invention.

Finally, in step S40, a droplet jetting amount of each color ink and a droplet jetting amount of a fluorescent ink, in which the difference between both the colorimetric values calculated in step S38 becomes a minimum, are selected for each color ink.

In step S40 of the invention, with respect to one color ink among the plurality of color inks, a patch of an ink image matter in which a difference between colorimetric values of a target color and the patch of the ink image matter becomes a minimum is selected, and a droplet jetting amount of the color ink and a droplet jetting amount of the fluorescent ink are determined in step S34 in which the selected patch of the ink image matter is generated. In this way, with respect to every color ink among all the color inks, it is possible to perform selection of a patch of an ink image matter in which a colorimetric value difference becomes a minimum and determination of a droplet jetting amount of the color ink and a droplet jetting amount of a fluorescent ink. Step S40 corresponds to a process (g) of selecting a droplet jetting amount of a color ink and a droplet jetting amount of a fluorescent ink in the invention.

In the above-described example, between the process of selecting the fluorescent ink in step S20 and the process of determining the droplet jetting position or the droplet jetting method of the fluorescent ink in step S22, the process of determining the droplet jetting amount of the fluorescent ink in step S32 is performed, but the invention is not limited thereto. The process of determining the droplet jetting amount of the fluorescent ink in step S32 may be performed any time before the jetting of droplets of the fluorescent ink is performed. For example, the process may be performed immediately before or immediately after the process of forming the color ink image layer 14 of step S24, or may be performed immediately before or immediately after the process of mixing the color ink and the fluorescent ink in step S28.

The ink image matter generating method of the invention is basically configured as described above.

Hereinbefore, various embodiments with respect to the ink image matter generating method of the invention have been described in detail, but the invention is not limited thereto, and various improvements or modifications may be made in a range without departing from the concept of the invention.

EXPLANATION OF REFERENCES 10, 11: ink image matter
12: medium (chromatic color medium)
14: color ink image layer
16: fluorescent ink layer
18: mixed ink layer

What is claimed is:

1. An ink image matter generating method for, when jetting droplets of an inkjet color ink on a medium to generate an ink image matter, selecting a fluorescent ink in the following processes (a) to (c), and jetting droplets of the selected fluorescent ink together with the color ink, or after the droplets of the color ink are jetted to cause the fluorescent ink to exist on a surface of the ink image matter, (a) a process of color-measuring a target color which is a target of color reproduction on the medium and the medium on which the color ink for color reproduction of the target color is printed;

(b) a process of calculating a difference between a colorimetric value of the target color and a colorimetric value of the medium on which the color ink is printed; and (c) a process of selecting a fluorescent ink for reducing the difference between the colorimetric value of the target color and the colorimetric value of the medium on which the color ink is printed, from fluorescent inks that are set in advance.

2. The ink image matter generating method according to claim 1,
wherein the medium is a chromatic color medium.

3. The ink image matter generating method according to claim 1,
wherein when wavelengths of respective colors of red R, green, and blue B are represented as $\lambda_R$, $\lambda_G$, and $\lambda_B$, respectively, wavelengths in which a light emitting spectrum becomes a maximum with respect to three fluorescent inks of an R light emitting fluorescent ink, a G light emitting fluorescent ink, and a B light emitting fluorescent ink which are set in advance are represented as $\lambda_R'$, $\lambda_G'$, and $\lambda_B'$, respectively, the nearest wavelengths on a short wavelength side at the time of 2% of maximum light emitting spectrum values are represented as $\lambda_R'$left, $\lambda_G'$left, and $\lambda_B'$left, and the nearest wavelengths on a long wavelength side at the time of 2% of the maximum light emitting spectrum values are represented as $\lambda_R'$right, $\lambda_G'$right, and $\lambda_B'$right,
each of three integrated differences of the respective colors of red R, green G, and blue B obtained by integrating a difference between reflection spectrums of each target color and each medium on which the color ink is printed in each wavelength band of $\lambda_R'$left$\leq\lambda_R\leq\lambda_R'$right, $\lambda_B'$left$\leq\lambda_B\leq\lambda_B'$right, and $\lambda_G'$left$\leq\lambda_G\leq\lambda_G'$right is used as the difference between the colorimetric values of the target color and the medium on which the color ink is printed, calculated in the calculating process (b).

4. The ink image matter generating method according to claim 3,
wherein in the selection process (c), in order to reduce a maximum integrated difference which is the largest value among the three integrated differences of the respective colors of red R, green G and blue B, a fluorescent ink having a wavelength band of a color corresponding to the maximum integrated difference as a wavelength band of a light emitting spectrum is selected.

5. The ink image matter generating method according to claim 1,
wherein when wavelengths of respective colors of red R, green G, and blue B are represented as $\lambda_R$, $\lambda_G$, and $\lambda_B$, respectively, and wavelengths in which a light emitting spectrum becomes a maximum with respect to three fluorescent inks of an R light emitting fluorescent ink, a G light emitting fluorescent ink, and a B light emitting fluorescent ink which are set in advance are represented as $\lambda_R'$, $\lambda_G'$, and $\lambda_B'$, respectively,
each of three short wavelength differences of the respective colors of red R, green G, and blue B obtained by selecting a difference between reflection spectrums of each target color and each medium on which the color ink is printed in each of $\lambda_R=\lambda_R'$, $\lambda_G=\lambda_G'$, $\lambda_B=\lambda_B'$ which is single wavelengths that represent red R, green G, and blue B is used as the difference between the colorimetric values of the target color and the medium on which the color ink is printed, calculated in the calculating process (b).

6. The ink image matter generating method according to claim 5,
wherein in the selection process (c), in order to reduce a maximum short wavelength difference which is the largest value among the three short wavelength differences of the respective colors of red R, green G, and blue B, a fluorescent ink having a wavelength band of a color corresponding to the maximum short wavelength difference as a wavelength band of a light emitting spectrum is selected.

7. The ink image matter generating method according to claim 1,
wherein after the droplets of the color ink are jetted on the medium, the droplets of the fluorescent ink are jetted on the color ink on the medium to cause the fluorescent ink to exist on the surface of the ink image matter.

8. The ink image matter generating method according to claim 1,
wherein the fluorescent ink is mixed with the color ink, and the droplets of the fluorescent ink are jetted on the medium together with the color ink to cause the fluorescent ink to exist on the surface of the ink image matter.

9. The ink image matter generating method according to claim 1,
wherein when among every two intersections between an excitation spectrum of the fluorescent ink and a reflection spectrum of each color ink among a plurality of color inks for generating the ink image matter, a wavelength of the nearest intersection on a short wavelength side when seen from a maximum wavelength in which the excitation spectrum of the fluorescent ink becomes a maximum is represented as $\lambda_{color}$left, and a wavelength of the nearest intersection on a long wavelength side when seen from the maximum wavelength is represented as $\lambda_{color}$right, and
when among integrated differences corresponding to the number of the plurality of color inks obtained by integrating a difference between the excitation spectrum of the fluorescent ink and the reflection spectrum of each color ink among the plurality of color inks for generating the ink image matter in a wavelength band of $\lambda_{color}$left$\leq\lambda_{color}\leq\lambda_{color}$right, one color ink having the largest value among the integrated differences is referred to as a color ink A and the other one or more color inks are referred to as a color ink B,
as a fluorescent ink droplet jetting method which is most preferentially performed, with respect to the color ink A, the droplets of the fluorescent ink are jetted in a region where droplets of the color ink A are not jetted, and with respect to the color ink B, the droplets of the fluorescent ink are jetted in a region where droplets of the color ink B are jetted, together with the color ink B or after the droplets of the color ink B are jetted, so that the fluorescent ink is caused to exist on the surface of the ink image matter.

10. The ink image matter generating method according to claim 9,
wherein in a case where a color difference between the color of the ink image matter on the medium on which the color ink for color reproduction of the target color is printed, obtained by performing the droplet jetting method of the fluorescent ink which is most preferentially performed, and the target color is larger than a target color difference, with respect to the color ink A, the droplets of the fluorescent ink are also jetted in a region where the droplets of the color ink A are jetted, in addition to the region where the droplets of the color ink A are not jetted, together with the color ink A or after the droplets of the color ink A are jetted, so that the fluorescent ink is caused to exist on the surface of the ink image matter.

11. The ink image matter generating method according to claim 1,
wherein a droplet jetting amount of the fluorescent ink is determined in the following processes (d) to (g), and the droplets of the fluorescent ink corresponding to the selected droplet jetting amount are jetted together with the color ink or after the droplets of the color ink are jetted,
(d) a process of generating patches of a plurality of ink image matters generated by varying a droplet jetting amount of each color ink and a droplet jetting amount of the fluorescent ink;
(e) a process of color-measuring the target color and all the patches of the plurality of ink image matters;
(f) a process of calculating differences between a colorimetric value of the target color and colorimetric values of all the patches for each color ink; and
(g) a process of selecting a droplet jetting amount of each color ink and a droplet jetting amount of the fluorescent ink in which a colorimetric value difference becomes a minimum, for each color ink.

* * * * *